United States Patent
Iwata et al.

(10) Patent No.: US 10,826,720 B2
(45) Date of Patent: Nov. 3, 2020

(54) SWITCHING DEVICE AND DETERMINATION METHOD

(71) Applicants: SUMITOMO ELECTRIC INDUSTRIES, LTD., Osaka (JP); AUTONETWORKS TECHNOLOGIES, LTD., Mie (JP); SUMITOMO WIRING SYSTEMS, LTD., Mie (JP)

(72) Inventors: Akihito Iwata, Osaka (JP); Hirofumi Urayama, Osaka (JP); Akihiro Ogawa, Osaka (JP); Takeshi Hagihara, Mie (JP); Yasuhiro Yabuuchi, Mie (JP)

(73) Assignees: Sumitomo Electric Industries, Ltd., Osaka-shi (JP); AutoNetworks Technologies, Ltd., Yokkaichi (JP); Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 16/337,160

(22) PCT Filed: Jun. 28, 2017

(86) PCT No.: PCT/JP2017/023672
§ 371 (c)(1),
(2) Date: Mar. 27, 2019

(87) PCT Pub. No.: WO2018/061363
PCT Pub. Date: Apr. 5, 2018

(65) Prior Publication Data
US 2019/0222437 A1 Jul. 18, 2019

(30) Foreign Application Priority Data

Sep. 27, 2016 (JP) .................... 2016-187941

(51) Int. Cl.
H04L 12/10 (2006.01)
H04L 12/46 (2006.01)
H04L 12/403 (2006.01)
H04L 12/40 (2006.01)

(52) U.S. Cl.
CPC ............ *H04L 12/403* (2013.01); *H04L 12/10* (2013.01); *H04L 12/40006* (2013.01);
(Continued)

(58) Field of Classification Search
None
See application file for complete search history.

(56) References Cited

U.S. PATENT DOCUMENTS 6,915,463 B2 7/2005 Vieregge et al.
9,325,516 B2 * 4/2016 Pera .................... H04L 12/2803
(Continued)

FOREIGN PATENT DOCUMENTS

JP S60-203034 A 10/1985
JP 2015-088815 A 5/2015
JP 2016-012932 A 1/2016

OTHER PUBLICATIONS

Office Action issued in U.S. Appl. No. 16/337,213, dated Dec. 9, 2019.
(Continued)

*Primary Examiner* — Michael Sun
(74) *Attorney, Agent, or Firm* — Baker Botts L.L.P.; Michael A. Sartori

(57) ABSTRACT

A switching device is a switching device mounted on a vehicle and includes a plurality of communication ports connectable to cables for Ethernet communication, a circuit operated by using power supplied via each of the communication ports, an acquisition unit that acquires a measurement result for noise of the power supplied via each of the communication ports, and a determination unit that performs
(Continued)

determination processing for determining whether or not power to be supplied via a corresponding one of the communication ports is to be output to the circuit based on the measurement result for noise acquired by the acquisition unit.

7 Claims, 11 Drawing Sheets

(52) U.S. Cl.
CPC .......... *H04L 12/46* (2013.01); *H04L 12/4625* (2013.01); *H04L 2012/40273* (2013.01)

(56) References Cited

U.S. PATENT DOCUMENTS

| | | | |
|---|---|---|---|
| 9,875,152 B2* | 1/2018 | Kessler | ............. H04L 12/40045 |
| 2005/0206530 A1* | 9/2005 | Cumming | .............. G01D 4/006 |
| | | | 340/870.02 |
| 2006/0181398 A1* | 8/2006 | Martich | .................. H04L 12/66 |
| | | | 340/538 |
| 2010/0076615 A1* | 3/2010 | Daniel | ...................... H02J 1/14 |
| | | | 700/293 |
| 2015/0058652 A1* | 2/2015 | Dawley | ..................... G06F 1/30 |
| | | | 713/340 |
| 2019/0118744 A1 | 4/2019 | Takamatsu et al. | |
| 2019/0229948 A1* | 7/2019 | Iwata | .................. H04Q 11/0062 |
| 2019/0331741 A1* | 10/2019 | Hittel | ...................... H04L 12/10 |

OTHER PUBLICATIONS

Notice of Allowance issued in U.S. Appl. No. 16/337,213, dated Mar. 25, 2020.

Notice of Allowance in U.S. Appl. No. 16/337,213, dated Jul. 8, 2020.

* cited by examiner

US 10,826,720 B2

SWITCHING DEVICE AND DETERMINATION METHOD

CROSS-REFERENCE TO RELATED APPLICATIONS

This application is the national phase under 35 U.S.C. § 371 of PCT International Application No. PCT/JP2017/023672 which has an International filing date of Jun. 28, 2017 and designated the United States of America, and is incorporated herein by reference in its entirety.

FIELD

The present disclosure relates to a switching device and a determination method.

The present application claims the benefit of Japanese Patent Application No. 2016-187941 filed on Sep. 27, 2016, the entire contents of which are herein incorporated by reference.

BACKGROUND

Japanese Patent Application Laid-Open No. 2016-12932 discloses a station side device as described below.

The station side device includes active (currently-used) OSUs 1 to N, standby (spare) OSU N+1 and a control unit. The control unit conveys management information on ONUs linked to a logical line to and from a network management system (NMS). The logical line is defined by a fixed combination of an optical line unit and a passive optical network. Meanwhile, the OSUs acquire management information linked to a real line. The real line indicates an actual combination of the optical line unit and the passive optical network. The control unit converts a line linked to the management information between the logical line and the real line reciprocally by using mapping information.

SUMMARY (1) A switching device according to the present disclosure is a switching device mounted on a vehicle. The switching device comprises a plurality of communication ports connectable to cables for Ethernet communication, a circuit operated by using power supplied via each of the communication ports, an acquisition unit that acquires a measurement result for noise in power supplied via each of the communication ports, and a determination unit that performs determination processing for determining whether or not power to be supplied via a corresponding one of the communication ports is to be output to the circuit based on the measurement result for noise acquired by the acquisition unit.

(7) A determination method according to the present disclosure is a determination method for a switching device mounted on a vehicle. The switching device includes a plurality of communication ports connectable to cables for Ethernet communication and a circuit operated by using power supplied via each of the communication ports. The determination method comprises: acquiring a measurement result for noise in power supplied via each of the communication ports; and determining whether or not power supplied via corresponding one of the communication ports is to be output to the circuit based on the acquired measurement result for noise.

One aspect of the present disclosure may be achieved as a switching device including such a characteristic processing unit as well as an on-vehicle communication system including the switching device and can be achieved as a program for causing a computer to execute such steps. Moreover, one aspect of the present disclosure may be achieved as a semiconductor integrated circuit realizing a part or all of the switching device.

The above and further objects and features of the disclosure will more fully be apparent from the following detailed description with accompanying drawings.

Figure 1:
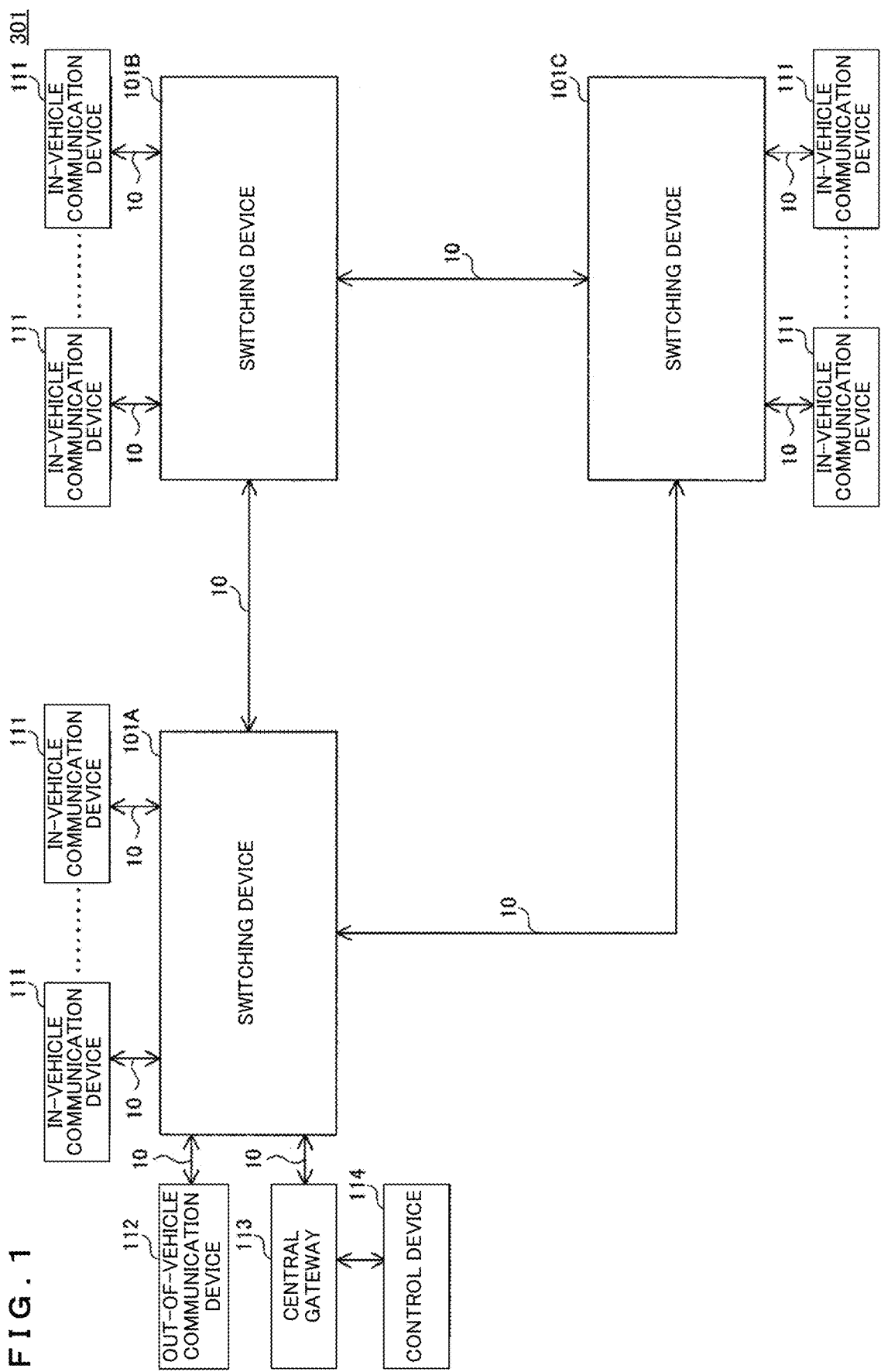
FIG. 1 illustrates an example of the configuration of an on-vehicle communication system according to Embodiment 1 of the present disclosure.

Conventionally, in order to offer a high quality service, techniques for performing duplication (redundancy) of a system have been developed.

Applying a redundant configuration as described in Japanese Patent Application Laid-Open No. 2016-12932 to an on-vehicle network, for example, is conceivable. In such a configuration, by employing Power over Ethernet (registered trademark) (PoE), signals as well as power can be supplied to a target device from another device connected through an Ethernet cable.

In such a configuration, a device serving as a supply source of the power may be a source of noise. In this case, the noise level of power to be transmitted by an Ethernet cable rapidly increases, which may cause unpreferable malfunction of the circuit in the target device. Thus, a technique is required that is capable of preventing power of degraded quality from being supplied to a circuit in the on-vehicle network.

The present disclosure is made to solve the above-described problems, and the object is to provide a switching device capable of preventing power of degraded quality from being supplied to a circuit in the on-vehicle network and a determination method.

According to the present disclosure, it is possible to prevent power of degraded quality from being supplied to a circuit in the on-vehicle network.

DESCRIPTION OF EMBODIMENTS OF THE PRESENT DISCLOSURE

Embodiments of the present disclosure are first listed and described.

(1) The switching device according to the embodiments of the present disclosure is a switching device mounted on a vehicle. The switching device comprises a plurality of communication ports connectable to cables for Ethernet communication, a circuit operated by using power supplied via each of the communication ports, an acquisition unit that acquires a measurement result for noise in power supplied via each of the communication ports, and a determination unit that performs determination processing for determining whether or not power to be supplied via a corresponding one of the communication ports is to be output to the circuit based on the measurement result for noise acquired by the acquisition unit.

By taking such a configuration that the noise of power supplied via each of the communication ports is acquired, in the case of detecting that the noise of power supplied from a certain communication port is large, for example, an output of power that is to be supplied via this communication port to the circuit can be stopped. Accordingly, it is possible to prevent power of degraded quality from being supplied to the circuit in the on-vehicle network. Moreover, power supplied via another communication port, for example, is output to the circuit, so that the circuit can normally be operated.

(2) Preferably, the switching device further comprises a storage unit that holds correspondences between a plurality of temperatures of the switching device and determination criteria in the determination processing as to the noise. The acquisition unit further acquires a temperature of the switching device of itself and acquires the correspondences from the storage unit. The determination unit performs the determination processing based on the temperature and the correspondences that are acquired by the acquisition unit.

According to such a configuration, if the upper limit of the magnitude of noise capable of well performing in the circuit processing of a signal received via the communication port varies depending on the temperature, for example, the criterion of determination depending on the temperature of the switching device can be acquired from the above-described correspondences. Thus, if noise making it difficult to well perform the above-described processing is included in the power received via a certain communication port, for example, it is possible to appropriately determine that power supplied from this communication port to the circuit is to be stopped.

(3) More preferably, the storage unit holds the correspondences for each of the communication ports.

According to such a configuration, if the temperature change in the upper limit of the magnitude of the noise capable of well performing in the circuit processing of a signal received via each of the communication ports varies from one communication port to another, for example, the criterion of determination depending on the temperature of the switching device for each communication port can be acquired from the above-described correspondences.

(4) Further preferably, the switching device further comprises a measurement unit that measures reception signal quality for each of the communication ports, and the determination unit performs the determination processing further based on the reception signal quality measured by the measurement unit.

Such a configuration enables determination processing taking the measured reception signal quality into account, and thus if the noise of power is large, it is possible to prevent stop of the output of power supplied via the corresponding communication port to the circuit from being uniformly determined. Concretely, even in the case where noise of the power is large, for example, if processing of a signal received via the communication port can be well performed in the circuit, it is possible to determine that the power supplied via the corresponding communication port is to be continuously supplied to the circuit.

(5) More preferably, the acquisition unit further acquires a measurement result for power supply voltage received via each of the communication ports, the determination unit judges a level of the noise and quality of the reception signal based on the measurement result for noise acquired by the acquisition unit and a measurement result for reception signal quality by the measurement unit, and performs the determination processing based on the measurement result for power supply voltage acquired by the acquisition unit and a measurement result for a signal voltage received via the communication port by the measurement unit if a judgement result for noise and a judgement result for reception signal quality are different from each other.

According to such a configuration, in the case where determination based on the above-described two judgment results cannot be easily performed, the determination processing is performed based on the measurement result for power supply voltage and the measurement result for signal voltage. Thus, by specifying the kind of the noise of the power, for example, and based on whether or not the noise of the specified kind is removable with a filter, it is possible to determine whether power supplied via the corresponding communication port to the circuit is to be stopped or to be continued, or if the noise of the power is small, but the reception signal quality is deteriorated due to the noise occurring inside the circuit, it is possible to determine that supplying of the power to the circuit is to be continuously made.

(6) Preferably, the acquisition unit acquires the measurement result for noise in power from a supply source of the power.

This makes it possible to make the configuration of the switching device simple in comparison with, for example, a case where the noise of power in the cable for Ethernet communication is measured in the switching device. Furthermore, since the noise of power can be measured without noise of a signal being mixed at the supply source of the power, the switching device can acquire a more correct measurement result.

(7) The determination method according to the embodiments of the present disclosure is a determination method for a switching device mounted on a vehicle. The switching device includes a plurality of communication ports connectable to cables for Ethernet communication and a circuit operated by using power supplied via each of the communication ports. The determination method comprises acquiring a measurement result for noise in power supplied via each of the communication ports, and determining whether or not power supplied via corresponding one of the communication ports is to be output to the circuit based on the acquired measurement result for noise.

By taking such a configuration that the noise of power supplied via each of the communication ports is acquired, in the case of, for example, detecting that the noise of power supplied from a certain communication port is large, an output of power that is to be supplied via this communication port to the circuit can be stopped. Accordingly, it is possible to prevent power of degraded quality from being supplied to the circuit in the on-vehicle network. Moreover, power supplied via another communication port, for example, is output to the circuit, so that the circuit can normally be operated.

The embodiments of the present disclosure will be described below with reference to the drawings thereof. It is noted that the same or corresponding parts are denoted by the same reference codes in the drawings to avoid repetitive descriptions. Furthermore, at least parts of the embodiments described below may arbitrarily be combined.

Embodiment 1

Configuration and Basic Operation

FIG. 1 illustrates an example of the configuration of an on-vehicle communication system according to Embodiment 1 of the present disclosure.

Referring to FIG. 1, an on-vehicle communication system 301 includes switching devices 101A, 101B and 101C. Hereafter, each of the switching devices 101A, 101B and 101C is also called a switching device 101.

The switching device 101 is mounted on a vehicle. In addition, multiple in-vehicle communication devices 111, an out-of-vehicle communication device 112, a central gateway 113 and a control device 114, for example, are mounted on the vehicle.

Note that the vehicle may be configured to be mounted with a single in-vehicle communication device 111 without being limited to the multiple in-vehicle communication devices 111. Furthermore, the vehicle may be configured to be mounted with multiple out-of-vehicle communication devices 112 without being limited to a single out-of-vehicle communication device 112.

The in-vehicle communication device 111 is, for example, a human machine interface, a camera, a sensor, a navigation device and so on, and is able to communicate with the switching device 101.

The out-of-vehicle communication device 112 can wirelessly communicate with a radio base station device (not illustrated) in compliance with a communication standard, for example, a long term evolution (LTE), 3G or the like as well as communicate with the switching device 101A.

The control device 114 is, for example, an engine control unit, an automatic transmission (AT) control unit, a hybrid electric vehicle (HEV) control unit, a brake control unit, a chassis control unit, a steering control unit and so on.

The central gateway 113 can communicate with the control device 114 via a controller area network (CAN) and communicate with the switching device 101A.

The central gateway 113 performs relay processing of information exchanged between the control device 114 and the in-vehicle communication device 111 as well as the out-of-vehicle communication device 112.

Note that, in the on-vehicle communication system 301, the out-of-vehicle communication device 112 and the central gateway 113 are configured to, but not limited to, be directly connected to the switching device 101A. The out-of-vehicle communication device 112 and the central gateway 113 may be configured to be directly connected to respective switching devices 101.

The switching devices 101A-101C are connected with one another through cables for on-vehicle Ethernet communication (hereinafter, also referred to as Ethernet cables) 10, for example. Furthermore, the switching device 101 is connected to the in-vehicle communication device 111, the out-of-vehicle communication device 112 and the central gateway 113 through the Ethernet cables 10, for example.

The switching device 101 can communicate with the in-vehicle communication device 111, the out-of-vehicle communication device 112 and the central gateway 113 that are directly connected to the device itself and can communicate with another switching device 101.

Information is exchanged between the switching device 101 and another device directly connected to this switching device 101 using an Ethernet frame, for example.

Furthermore, the switching device 101 is operated by power received from the in-vehicle communication device 111, the out-of-vehicle communication device 112, the central gateway 113 and so on that are directly connected to the device itself by employing PoE, for example.

Hereafter, a device that is capable of supplying power to a target switching device 101 through the Ethernet cable 10 by employing PoE will be defined as a power supply device. Two or more power supply devices are directly connected to the switching device 101 through the Ethernet cables 10.

The power supply device superposes direct current voltage for power supply on signal voltage for alternate current indicating an Ethernet frame and transmits the superposed voltage to a target switching device 101 thorough the Ethernet cable 10.

Problems

The switching device 101 can receive power from, for example, multiple power supply devices in parallel and can be operated by the power. The DC voltage for power supply output from the power supply device may include ripple, spike noise and so on. In such a case, the power supply device becomes the source of noise, so that the switching device 101 may receive noise from the power supply device.

It is difficult for an impedance measuring method normally employed for detecting a disconnection of a signal line to detect noise as described above. Thus, a technique is required that is capable of detecting noise of power and preventing power including noise from being supplied to the internal circuit of the switching device 101 based on the result of the detection.

Hence, the switching device according to the embodiments of the present disclosure solves such problems by taking the following configurations and operation.

Configuration of Switching Device 101

Figure 2:
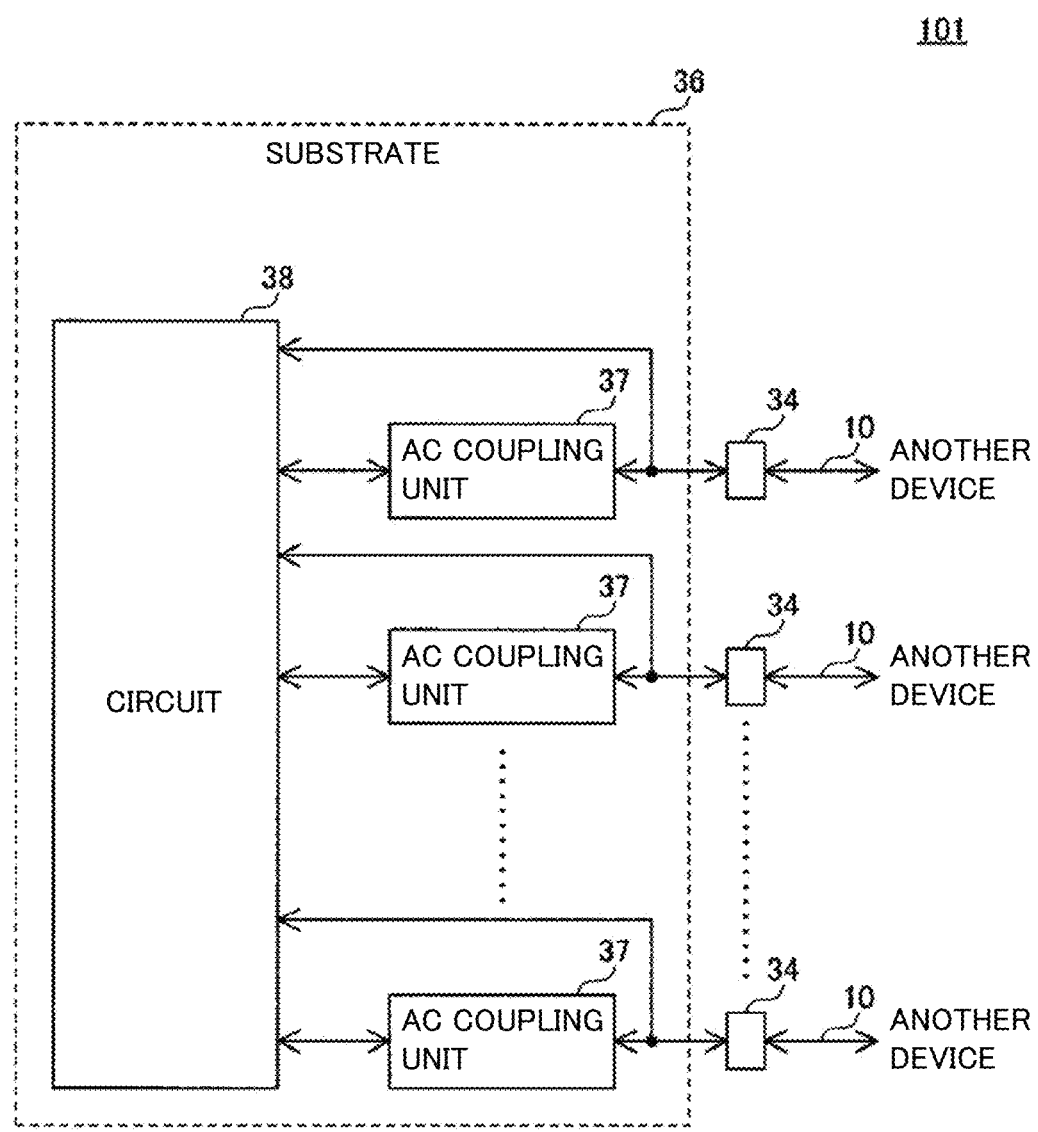
FIG. 2 illustrates an example of the configuration of a switching device in the on-vehicle communication system according to Embodiment 1 of the present disclosure.

FIG. 2 illustrates an example of the configuration of a switching device in the on-vehicle communication system according to Embodiment 1 of the present disclosure.

Referring to FIG. 2, the switching device 101 includes multiple communication ports 34, multiple AC coupling units 37 and a circuit 38.

The multiple AC coupling units 37 and the circuit 38 are provided on, for example, a substrate 36. Note that at least one of the multiple AC coupling units 37 and the circuit 38 may be provided on a different substrate.

The communication port 34 can be connected to a cable used for Ethernet communication. Concretely, the communication port 34 is a terminal to which the Ethernet cable 10, for example, can be connected. Note that the communication port 34 may be a terminal of an integrated circuit.

Each of the multiple communication ports 34 is connected to any one of another switching device 101, the in-vehicle communication device 111, the out-of-vehicle communication device 112 and the central gateway 113 through the Ethernet cable 10.

The AC coupling unit 37 is a high-pass filter, for example, and is provided for each communication port 34. The AC coupling unit 37 attenuates a component that is equal to or lower than a predetermined frequency out of the frequency components of a signal received through the Ethernet cable 10 connected to the corresponding communication port 34.

Figure 3:
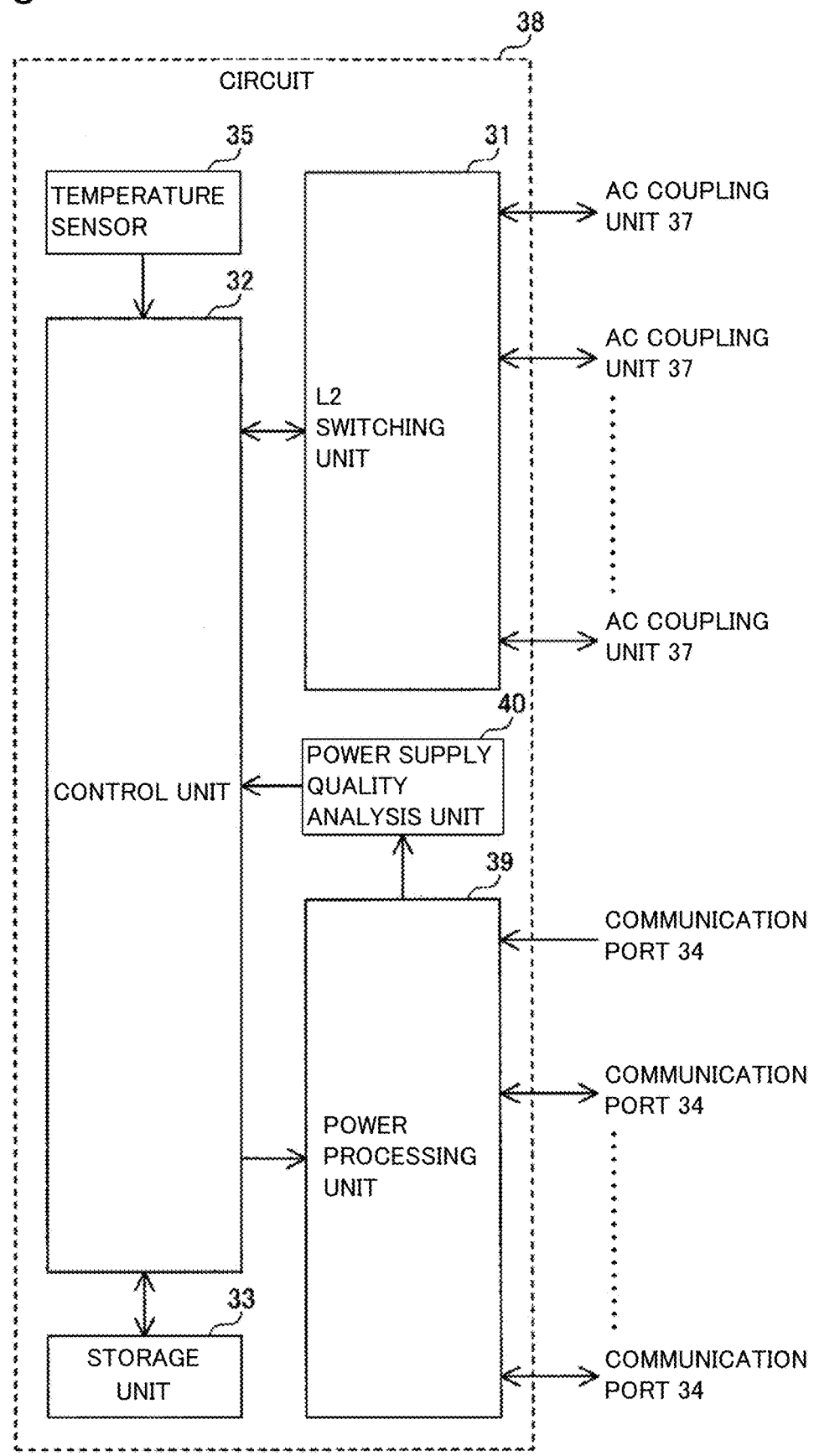
FIG. 3 illustrates an example of the configuration of a circuit in the switching device according to Embodiment 1 of the present disclosure.

FIG. 3 illustrates an example of the configuration of the circuit of the switching device according to Embodiment 1 of the present disclosure.

Referring to FIG. 3, the circuit 38 includes a layer 2 (L2) switching unit (measurement unit) 31, a control unit (determination unit and acquisition unit) 32, a storage unit 33, a temperature sensor 35, a power processing unit 39 and a power supply quality analysis unit (acquisition unit) 40.

Figure 4:
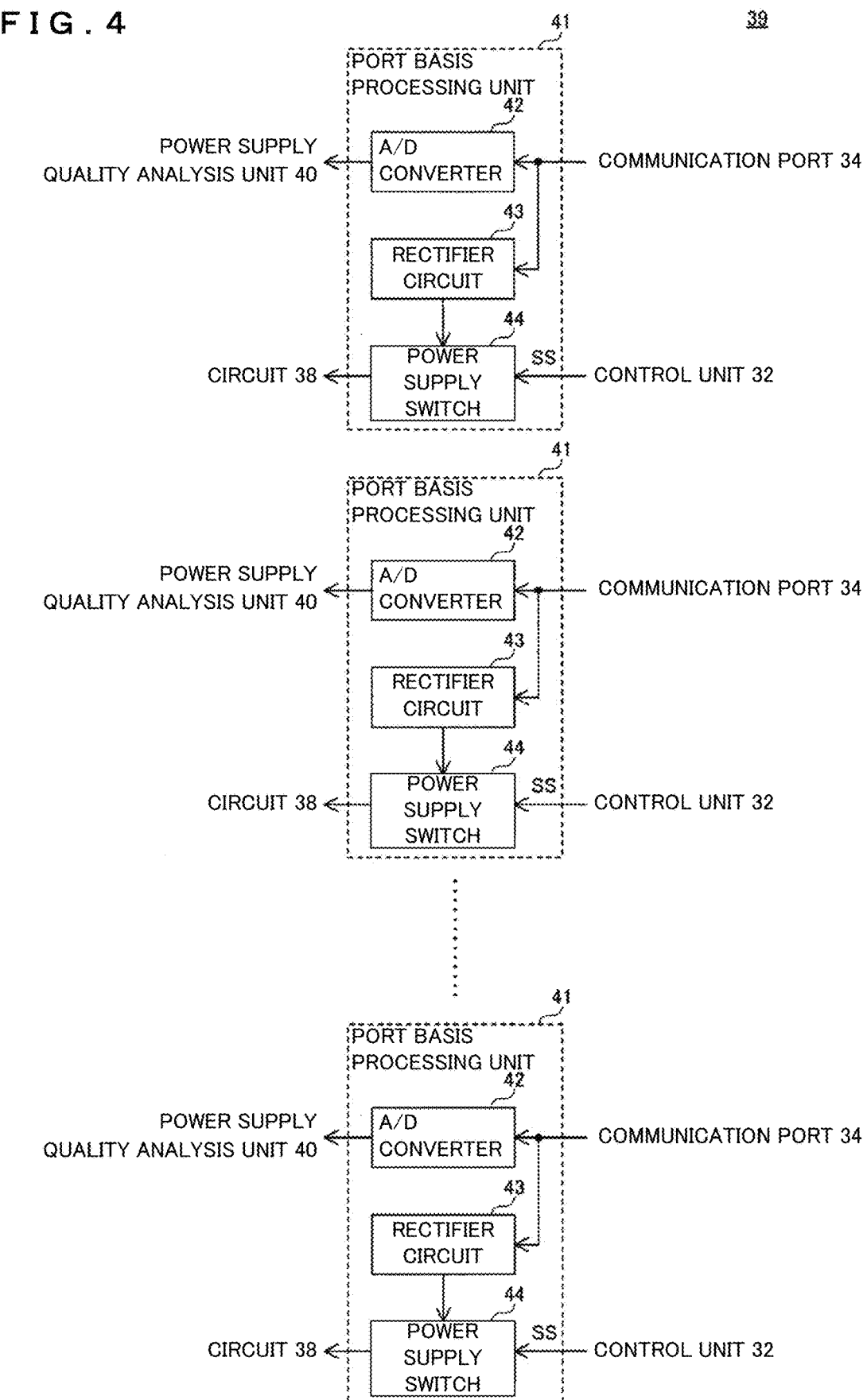
FIG. 4 illustrates an example of the configuration of an electric power processing unit in the circuit according to Embodiment 1 of the present disclosure.

FIG. 4 illustrates an example of the configuration of an electric power processing unit in the circuit according to Embodiment 1 of the present disclosure.

Referring to FIG. 4, the power processing unit 39 includes multiple port basis processing units 41. The port basis processing units 41 each include an A/D converter (ADC) 42, a rectifier circuit 43 and a power supply switch 44.

The port basis processing units 41 is provided for each communication port 34, for example. The A/D converter 42 in each of the port basis processing units 41 converts analog voltage received through the Ethernet cable 10 connected to the corresponding communication port 34 into a digital signal for every predetermined sampling period. The A/D converter 42 outputs the converted digital signal to the power supply quality analysis unit 40.

The rectifier circuit 43 rectifies current received through the Ethernet cable 10 connected to the corresponding communication port 34 and outputs power based on the rectified current to the power supply switch 44.

When receiving a signal SS of logical high level from the control unit 32, for example, the power supply switch 44 shifts to ON so as to output power received from the rectifier circuit 43 to the circuit 38. When, on the other hand, receiving a signal SS of logical low level from the control unit 32, for example, the power supply switch 44 shift to OFF so as not to output power received from the rectifier circuit 43 to the circuit 38.

In the normal state, the control unit 32 outputs a signal SS of logical high level to the power supply switch 44 of each of the port basis processing units 41. Accordingly, the power supply switch 44 of each of the port basis processing units 41 is ON.

Referring again to FIG. 3, the circuit 38 is operated by using power supplied via each of the communication ports 34. More specifically, the circuit 38 is operated by using power supplied from the port basis processing units 41 in the power processing unit 39.

The temperature sensor 35 measures the temperature Ta of the substrate 36 and periodically, for example, outputs temperature information indicating the measurement result to the control unit 32.

The power supply quality analysis unit 40 acquires the measurement result for noise in power supplied via the communication port 34 and the measurement result for power supply voltage. Concretely, the power supply quality analysis unit 40 measures the noise of the power and the power supply voltage.

More specifically, the power supply quality analysis unit 40 accumulates digital signals received from each of the A/D converters 42 for a predetermined time period to thereby generate a waveform Wpow representing a time variation of the voltage for each communication port 34, which is an example of the measurement result for power supply voltage.

The power supply quality analysis unit 40 acquires a difference between the maximum voltage and the minimum voltage for the generated waveform Wpow for each communication port 34, that is, a noise amplitude Apow as a measurement result for noise. The power supply quality analysis unit 40 periodically, for example, outputs supply power noise information including a noise amplitude Apow and a waveform Wpow for each communication port 34 to the control unit 32.

The L2 switching unit 31 has a signal processing circuit for each communication port 34, for example. Each signal processing circuit is assigned with a unique address, for example, a media access control (MAC) address. Each signal processing circuit can communicate with another switching device 101, the in-vehicle communication device 111, the out-of-vehicle communication device 112 and the central gateway 113 via the corresponding communication port 34.

Furthermore, the L2 switching unit 31 of the switching device 101A may perform, for example, layer 3 (L3) routing. Note that the L2 switching unit 31 of the switching devices 101B and 101C may be configured to be able to perform L3 routing.

The L2 switching unit 31 transmits an Ethernet frame received from one device to another device corresponding to the destination.

Furthermore, the L2 switching unit 31 measures reception signal quality for each of the communication ports 34, for example. More specifically, the L2 switching unit 31 measures a signal-to-noise ratio (SNR) of a signal passing through the AC coupling unit 37, that is, of a reception signal including an Ethernet frame, the SNR being one example of a reception signal quality, for each communication port 34. In this example, the larger the SNR value is, the less the noise is, resulting in a better reception signal quality. The L2 switching unit 31 periodically, for example, outputs SNR information indicating the measurement result to the control unit 32.

Moreover, the L2 switching unit 31 measures signal voltage for each communication port 34 and the noise of the signal voltage, for example. More specifically, the L2 switching unit 31 includes ADCs for the respective communication ports 34, for example. The L2 switching unit 31 converts signal voltage received from the corresponding communication port 34 via the AC coupling unit 37 into a digital signal for every predetermined sampling period by using each of the ADCs.

The L2 switching unit 31 accumulates the converted digital signals for a predetermined time period to thereby generate a waveform Wsig representing a time variation of the signal voltage for each communication port 34, which is an example of the result of the measurement of the signal voltage.

The L2 switching unit 31 acquires a difference between the maximum voltage and the minimum voltage, that is, a noise amplitude Asig as a measurement result for noise in signal voltage for the generated waveform Wsig for each communication port 34. The L2 switching unit 31 periodically, for example, outputs signal noise information including the noise amplitude Asig and the waveform Wsig for each communication port 34 to the control unit 32.

Figure 5:
FIG. 5 illustrates an example of a threshold table held in a storage unit of the switching device according to Embodiment 1 of the present disclosure.

FIG. 5 illustrates an example of a threshold table held in a storage unit of the switching device according to Embodiment 1 of the present disclosure.

Referring to FIG. 5, the storage unit 33 is, for example, a nonvolatile memory, and holds association between multiple temperatures of the switching device 101 and determination criteria in the determination processing as to noise. The determination processing will be described later.

More specifically, the storage unit 33 registers for each communication port 34 a threshold table TT1, which is one example of the above-described correspondences, for example.

The threshold table TT1 includes each of the correspondences between the temperature Ta of the substrate 36 and a threshold Th1 which is a criterion for determination processing at the temperature Ta, for example.

The threshold table TT1 is created by the following method, for example. The developer calculates a cyclic redundancy check (CRC) value based on the data included in an Ethernet frame received via a target communication port 34, for example. The developer compares the calculated CRC value and the value in a frame check sequence field (hereinafter, also referred to as an FCS value) included in this Ethernet frame.

The developer records the probability of occurrence of inconsistency between the CRC value and the FCS value while varying noise amplitude Apow at a certain temperature Ta, for example. The developer then employs the noise amplitude Apow for which the probability of occurrence of inconsistency is above a predetermined value as a threshold Th1 for the target communication port 34 at this temperature Ta.

The developer similarly determines a threshold Th1 at another temperature Ta to complete the threshold table TT1.

The control unit 32 performs determination processing as to whether or not power supplied via the corresponding communication port 34 is to be output to the circuit 38, based on the measurement result for noise acquired by the power supply quality analysis unit 40.

Specifically, the control unit 32 performs the determination processing based on, for example, the above-mentioned measurement result for noise, the temperature of the switching device 101 of itself, the above-mentioned correspondences and the reception signal quality measured by the L2 switching unit 31.

More specifically, the control unit 32 judges the level of the noise and the quality of the reception signal based on, for example, the above-mentioned measurement result for noise, the temperature of the switching device 101 of itself, the above-mentioned correspondences and the measurement result for reception signal quality by the L2 switching unit 31.

Concretely, the control unit 32 performs determination processing for each communication port 34 every predetermined time, for example.

The control unit 32 acquires the temperature of the switching device 101 of itself and acquires the above-described correspondences from the storage unit 33, for example. More specifically, the control unit 32 acquires a temperature Ta from the latest temperature information received from the temperature sensor 35 and acquires a threshold table TT1 corresponding to the communication port 34 that is a target of determination (hereinafter also referred to as a target port) from the storage unit 33 when a timing for performing the determination processing comes, for example.

The control unit 32 then acquires a threshold Th1 corresponding to the temperature Ta from the obtained threshold table TT1.

The control unit 32 compares the threshold Th1 with the noise amplitude Apow of the target port included in the latest supply power noise information received from the power supply quality analysis unit 40.

The control unit 32 judges that the noise of the supply power is at a harmful level if the noise amplitude Apow is equal to or larger than the threshold Th1, whereas it judges that the noise of the supply power is at a harmless level if the noise amplitude Apow is smaller than the threshold Th1, for example.

Furthermore, the control unit 32 acquires an SNR for the target port based on the latest SNR information received from, for example, the L2 switching unit 31.

The control unit 32 judges that the noise of the reception signal is at a harmless level if the acquired SNR is equal to or larger than a predetermined threshold Th2, whereas it judges that the noise of the reception signal is at a harmful level if the SNR is smaller than the threshold Th2, for example.

If judging that both of the noise of the supply power and the noise of the reception signal are at harmful levels, for example, the control unit 32 determines that the power supplied via the target port 34 is not to be output to the circuit 38.

The control unit 32 then outputs a signal SS of logical low level to the power supply switch 44 corresponding to the target port (see FIG. 4). This causes the power supply switch 44 to shift to OFF, so that power supplied via the target port 34 is not output to the circuit 38.

If, on the other hand, judging that both of the noise of the supply power and the noise of the reception signal are at harmless levels, the control unit 32 determines that the power supplied via the target port 34 is to be continuously output to the circuit 38, for example.

In this case, the control unit 32 continuously outputs a signal SS of logical high level to the power supply switch 44 corresponding to the target port.

Moreover, if the judgment result for noise and the judgement result for reception signal quality are different from each other, for example, the control unit 32 performs determination processing based on the measurement result for power supply voltage acquired by the power supply quality analysis unit 40 and the measurement result for signal voltage received via the communication port 34 by the L2 switching unit 31.

Concretely, if judging that the noise of the supply power is at a harmless level and the noise of the reception signal is at a harmful level, or if judging that the noise of the supply power is at a harmful level and the noise of the reception signal is at a harmless level, the control unit 32 performs determination processing based on the supply power noise information and the signal noise information.

More specifically, if judging that the noise of the supply power is at a harmful level and the noise of the reception signal is at a harmless level, for example, the control unit 32 confirms the presence or absence of spike noise in the waveform Wpow for the target port included in the supply power noise information and the presence or absence of spike noise in the waveform Wsig for the target port included in the signal noise information.

Here, in the case where, upon measurement of the SNR by the L2 switching unit 31, for example, an SNR is calculated from an average value of the noise during a time duration that is much longer than that of the spike noise, it may be judged that the noise of the reception signal is at a harmless level even if spike noise is included in the waveform Wsig.

If confirming that spike noise is included in each of the waveform Wpow and the waveform Wsig, the control unit 32 compares the waveform Wpow with the waveform Wsig. If the spike noise in the waveform Wpow and the spike noise in the waveform Wsig are synchronized with each other, the control unit 32 recognizes that the noise of the supply power may adversely affect the signal processing in the L2 switching unit 31 and determines that the power to be supplied via the target port 34 is not to be output to the circuit 38.

The control unit 32 then outputs a signal SS of logical low level to the power supply switch 44 corresponding to the target port.

If, on the other hand, confirming that spike noise is not included in each of the waveform Wpow and the waveform Wsig, the control unit 32 confirms the presence or absence of ripple and the magnitude thereof in the waveform Wpow and the waveform Wsig. Since the ripple here includes large amounts of low frequency components, for example, the ripple is attenuated by the AC coupling unit 37. Accordingly, even if ripple is included in the waveform Wpow, the measurement result for SNR by the L2 switching unit 31 may be good.

When confirming that ripple is included in the waveform Wpow, but ripple is sufficiently attenuated in the waveform Wsig, the control unit 32 recognizes that the noise of the supply power does not adversely affect the signal processing by the L2 switching unit 31, and determines that the power supplied via the target port 34 is to be continuously output to the circuit 38, for example.

Furthermore, if judging that the noise of the supply power is at a harmless level and the noise of the reception signal is at a harmful level, the control unit 32 confirms the noise of the waveform Wpow and the noise of the waveform Wsig, for example.

The control unit 32 presumes that the cause for the noise of the reception signal being at a harmful level is noise occurring inside the L2 switching unit 31 if the noise of the waveform Wpow and the noise of the waveform Wsig are small.

Since there is no problem with noise in the supply power, the control unit 32 then determines that the power supplied via the target port 34 is to be continuously output to the circuit 38 and records the log of the presumption result, for example.

The control unit 32 records a log of the processing every time the determination processing is performed, for example. Furthermore, the control unit 32 similarly performs determination processing for another communication port 34.

Operation

Each of the devices in the on-vehicle communication system 301 includes a computer, and the arithmetic processing unit such as a CPU or the like in the computer reads out a program including a part or all of the steps in sequence diagrams or flowcharts described below from a memory (not illustrated) and executes it. Each of the programs of these multiple devices may externally be installed. Each of the programs of these multiple devices is made commercially available in such a manner as to be stored in a recording medium.

Figure 6:
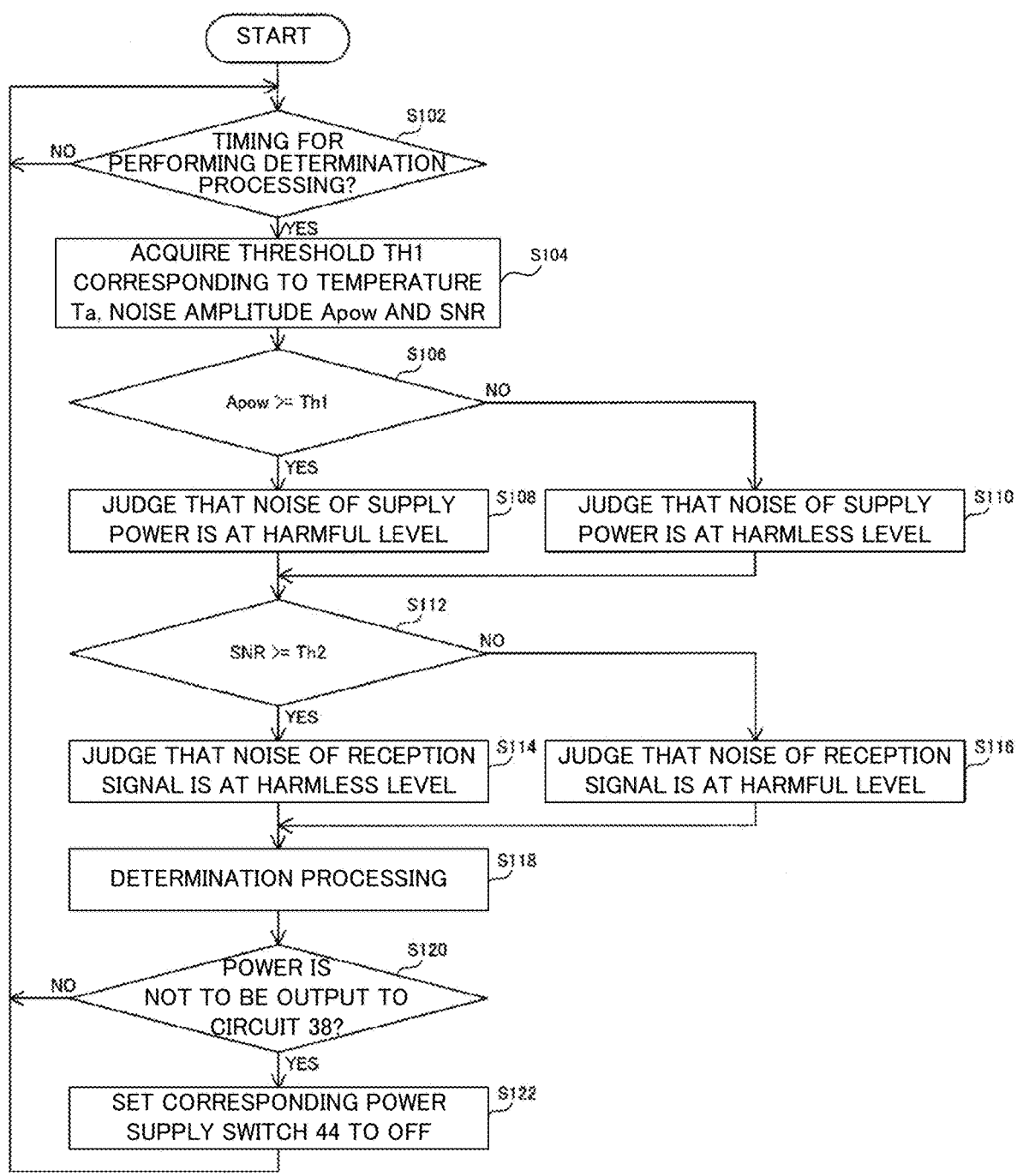
FIG. 6 is a flowchart defining an operation procedure when the switching device according to Embodiment 1 of the present disclosure judges each of the measurement results.

FIG. 6 is a flowchart defining an operation procedure performed when the switching device according to Embodiment 1 of the present disclosure judges each of the measurement results. FIG. 6 describes the processing for a target port, although the same applies to another communication port 34.

Referring to FIG. 6, the switching device 101 is first held on standby until a timing for performing determination processing comes (NO at step S102).

When the timing for performing determination processing comes (YES at step S102), the switching device 101 acquires a temperature Ta, acquires a threshold Th1 corresponding to the temperature Ta from the threshold table TT1 for a target port and also acquires the noise amplitude Apow and SNR for the target port (step S104).

Next, if the noise amplitude Apow is equal to or larger than a threshold Th1 (YES at step S106), the switching device 101 then judges that the noise of the supply power is at a harmful level (step S108).

If, on the other hand, the noise amplitude Apow is smaller than the threshold Th1 (NO at step S106), the switching device 101 judges that the noise of the supply power is at a harmless level (step S110).

Next, if judging that the noise of the supply power is at a harmful level (step S108) or if judging that the noise of the supply power is at a harmless level (step S110), the switching device 101 compares the SNR with a threshold Th2 (step S112).

If the SNR is equal to or larger than the threshold Th2 (YES at step 112), the switching device 101 judges that the noise of the reception signal is at a harmless level (step S114).

If, on the other hand, the SNR is smaller than the threshold Th2 (NO at step 112), the switching device 101 judges the noise of the reception signal is at a harmful level (step S116).

Next, if judging that the noise of the reception signal is at a harmless level (step S114) or judging that the noise of the reception signal is at a harmful level (step S116), the switching device 101 performs determination processing (step S118).

Then, if determining that the power to be supplied via the target port is not to be output to the circuit 38 (YES at step S120), the switching device 101 sets the power supply switch 44 corresponding to the target port to OFF (step S122).

Succeedingly, if determining that the power to be supplied via the target port is to be continuously output to the circuit 38 (NO at step S120) or if setting the power supply switch 44 to OFF (step S122), the switching device 101 is held standby until a new timing for performing determination processing comes (NO at step S102).

Figure 7:
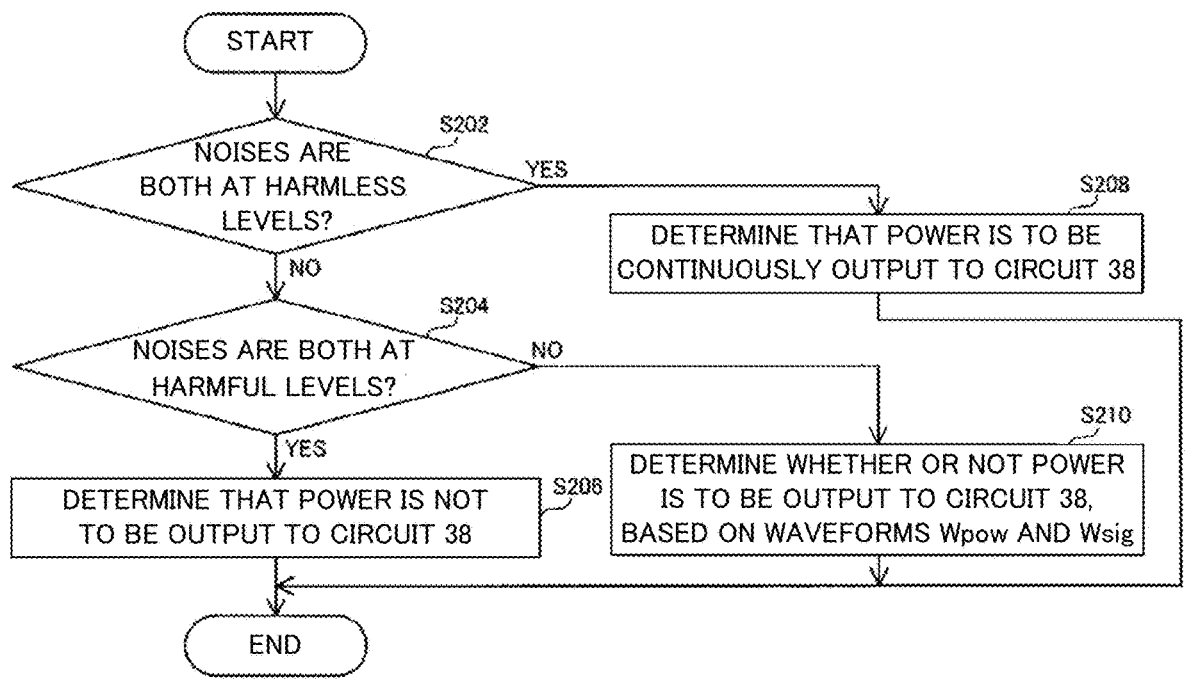
FIG. 7 is a flowchart defining an operation procedure when the switching device according to Embodiment 1 of the present disclosure performs determination processing.

FIG. 7 is a flowchart defining an operation procedure performed when the switching device according to Embodiment 1 of the present disclosure performs determination processing. FIG. 7 illustrates the details of the operation at step S118 in FIG. 6.

Referring to FIG. 7, if judging that the noise of the supply power and the noise of the reception signal are both at harmless levels (YES at step S202), the switching device 101 first determines that power to be supplied via the target port is to be continuously output to the circuit 38 (step S208).

If, on the other hand, judging that the noise of the supply power and the noise of the reception signal are both at harmful levels (NO at step S202 and YES at step S204), the switching device 101 determines that power to be supplied via the target port is not to be output to the circuit 38 (step S206).

Moreover, if judging that either one of the noise of the supply power or the noise of the reception signal is at a harmless level or a harmful level (NO at step S202 and NO at step S204), the switching device 101 determines whether or not the power to be supplied via the target port is to be output to the circuit 38, based on the waveforms Wpow and Wsig (step S210).

Note that in the switching device according to Embodiment 1 of the present disclosure, the control unit 32 is configured, but not limited, to perform determination processing based on the measurement result for noise acquired by the power supply quality analysis unit 40, the temperature of the switching device 101 of itself, the threshold table TT1 and the reception signal quality measured by the L2 switching unit 31 as well as the measurement result for power supply voltage acquired by the power supply quality analysis unit 40 and the measurement result for signal voltage received via the communication port 34 by the L2 switching unit 31. The control unit 32 may be configured to perform determination processing based on the above-mentioned measurement result for noise in power without using the temperature of the switching device 101 of itself, the threshold table TT1, the reception signal quality, the measurement result for power supply voltage and the measurement result for signal voltage. Concretely, the control unit 32 performs the determination processing based on whether the noise amplitude Apow of the target port is larger or smaller than a predetermined threshold, for example.

Furthermore, the control unit 32 may be configured to perform determination processing based on the above-mentioned measurement result for noise in power, the temperature of the switching device 101 of itself and the threshold table TT1 without using the reception signal quality, the measurement result for power supply voltage and the measurement result for signal voltage.

Moreover, the control unit 32 may be configured to perform determination processing based on the above-mentioned measurement result for noise in power and the reception signal quality without using the temperature of the switching device 101 of itself, the threshold table TT1, the measurement result for power supply voltage and the measurement result for signal voltage. Concretely, the control unit 32 judges the level of the noise based on whether the noise amplitude Apow of a target port is larger or smaller than a predetermined threshold, and judges the quality of the reception signal based on whether the SNR of the reception signal is larger or smaller than a predetermined threshold, for example. The control unit 32 determines that power to be supplied via the target port is not to be output to the circuit 38 if at least one of the two judgement results indicates a negative result.

Furthermore, the switching device according to Embodiment 1 of the present disclosure is configured to register, but not limited to, the threshold table TT1 in the storage unit 33 for each communication port 34. The switching device 101 may be configured to register a threshold table TT1 common to the communication ports 34 in the storage unit 33.

Moreover, the switching device according to Embodiment 1 of the present disclosure is configured, but not limited, to use the temperature Ta of the substrate 36 for the determination processing. The switching device 101 may be configured to use the temperature of the control unit 32, the temperature of the L2 switching unit 31 and so on for the determination processing.

In the switching device according to Embodiment 1 of the present disclosure, the control unit 32 is configured to judge the quality of the reception signal by using, but not limited thereto, the SNR. The control unit 32 may be configured to judge the quality of the reception signal by using the noise amplitude Asig.

Meanwhile, applying a redundant configuration as described in Japanese Patent Application Laid-Open No. 2016-12932 to an on-vehicle network is conceivable, for example. In such configuration, by employing PoE, for example, signals as well as power can be supplied to a target device from another device connected through an Ethernet cable.

In such a configuration, a device serving as a supply source of the power may be a source of noise. In this case, the noise level of power to be transmitted by an Ethernet cable rapidly increases, resulting in a malfunction of the circuit in the target device, which is unpreferable. Thus, a technique is required that is capable of preventing power of degraded quality from being supplied to a circuit in the on-vehicle network.

In contrast thereto, the switching device according to Embodiment 1 of the present disclosure is mounted on a vehicle. A plurality of communication ports 34 are connectable to cables for Ethernet communication. The circuit 38 is operated by using power supplied via each of the communication ports 34. The power supply quality analysis unit 40 acquires the measurement result for noise in power supplied via each of the communication ports 34. The control unit 32 performs determination processing as to whether or not power to be supplied via a corresponding one of the communication ports 34 is to be output to the circuit 38 based on the measurement result for noise acquired by the power supply quality analysis unit 40.

By taking such a configuration that the noise of power supplied via each of the communication ports 34 is acquired, in the case of detecting that the noise of power supplied from a certain communication port 34 is large, for example, an output of power that is to be supplied via this communication port 34 to the circuit 38 can be stopped. Accordingly, it is possible to prevent power of degraded quality from being supplied to the circuit in the on-vehicle network. Moreover, power supplied via another communication port 34, for example, is output to the circuit 38, so that the circuit 38 can normally be operated.

Furthermore, in the switching device according to Embodiment 1 of the present disclosure, the storage unit 33 holds correspondences between a plurality of temperatures Ta of the switching device 101 and determination criteria in the determination processing as to the noise. The control unit 32 acquires a temperature of the switching device 101 of itself and acquires the correspondences from the storage unit 33. The control unit 32 then performs the determination processing further based on the acquired temperature and the above-mentioned correspondences.

According to such a configuration, if the upper limit of the magnitude of the noise capable of well performing in the circuit 38 processing of a signal received via the communication port 34 varies depending on the temperature, for example, the criterion of determination depending on the temperature of the switching device 101 can be acquired from the above-described correspondences. Thus, if noise making it difficult to well perform the above-described processing is included in the power received via a certain communication port 34, for example, it is possible to appropriately determine that power supplied from this communication port 34 to the circuit 38 is to be stopped.

Moreover, in the switching device according to Embodiment 1 of the present disclosure, the storage unit 33 holds correspondences for each of the communication ports 34.

According to such a configuration, if the temperature change in the upper limit of the magnitude of the noise capable of well performing in the circuit 38 processing of a signal received via each of the communication ports 34 varies from one communication port to another, for example, the criterion of determination depending on the temperature of the switching device 101 for each communication port 34 can be acquired from the above-described correspondences.

Additionally, in the switching device according to Embodiment 1 of the present disclosure, the L2 switching unit 31 measures reception signal quality for each of the communication ports 34. The control unit 32 performs determination processing further based on the reception signal quality measured by the L2 switching unit 31.

Such a configuration enables the determination processing taking the measured reception signal quality into account, and thus if the noise of power is large, it is possible to prevent stop of the output of power supplied via the corresponding communication port 34 to the circuit 38 from being uniformly determined. Concretely, even in the case where noise of the power is large, if processing of a signal received via the communication port 34 can be well performed, for example, it is possible to determine that the power supplied via the corresponding communication port 34 is to be continuously supplied to the circuit 38.

In addition, in the switching device according to Embodiment 1 of the present disclosure, the power supply quality analysis unit 40 further acquires a measurement result for power supply voltage received via the communication port 34. The control unit 32 judges the level of the noise and quality of the reception signal based on the measurement result for noise acquired by the power supply quality analysis unit 40 and the measurement result for reception signal quality by the L2 switching unit 31. The control unit 32 performs the determination processing based on the measurement result for power supply voltage acquired by the power supply quality analysis unit 40 and the measurement result for signal voltage received via the communication port 34 by the L2 switching unit 31 if the judgement result for noise and reception signal quality are different from each other.

According to such a configuration, in the case where determination based on the above-described two judgment results cannot be easily performed, the determination processing is performed based on the measurement result for power supply voltage and the measurement result for signal voltage. Thus, by specifying the kind of the noise of the power, for example, and based on whether or not the noise of the specified kind is removable with a filter, it is possible to determine whether power supplied via the corresponding communication port 34 to the circuit 38 is to be stopped or to be continued, or if the noise of the power is small but the reception signal quality is deteriorated due to the noise occurring inside the circuit 38, it is possible to determine that supply of the power to the circuit 38 is to be continuously made.

The following describes another embodiment of the present disclosure with reference to the drawings thereof. Note that the same or corresponding parts are denoted by the same reference codes in the drawings to avoid repetitive descriptions therefor.

Embodiment 2

The present embodiment relates to an on-vehicle communication system that acquires supply power noise information from another device unlike the switching device according to Embodiment 1. The details other than the following description are similar to those of the switching device according to Embodiment 1.

Figure 8:
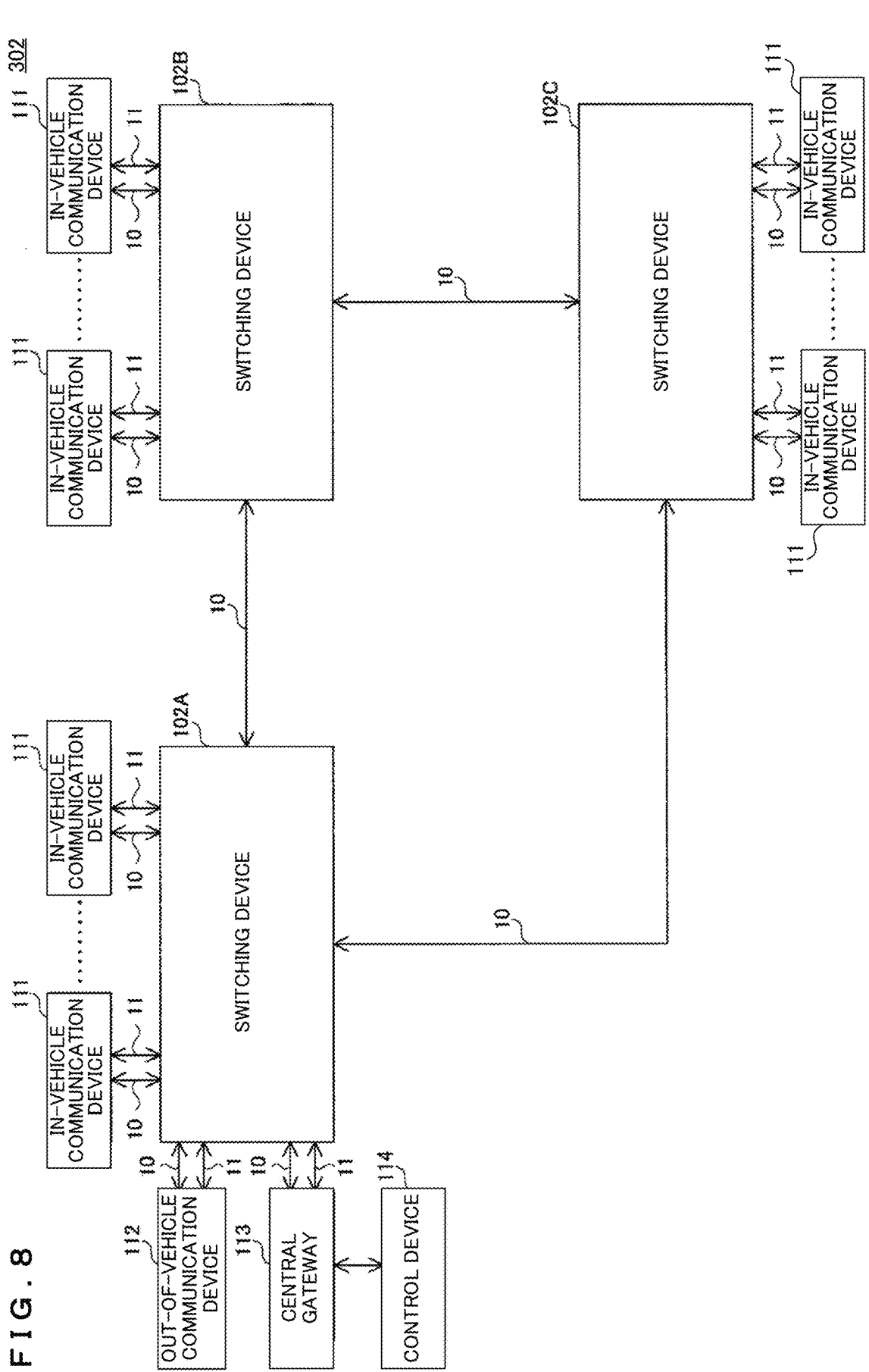
FIG. 8 illustrates an example of the configuration of an on-vehicle communication system according to Embodiment 2 of the present disclosure.

FIG. 8 illustrates an example of the configuration of an on-vehicle communication system according to Embodiment 2 of the present disclosure.

Referring to FIG. 8, an on-vehicle communication system 302 includes switching devices 102A, 102B and 102C. Hereafter, each of the switching devices 102A, 102B and 102C may also be referred to as a switching device 102.

An in-vehicle communication device 111, an out-of-vehicle communication device 112, a central gateway 113 and a control device 114 illustrated in FIG. 8 are respectively similar in operation to the in-vehicle communication device 111, the out-of-vehicle communication device 112, the central gateway 113 and the control device 114 illustrated in FIG. 1.

The switching device 102 and the power supply device, that is, the in-vehicle communication device 111, the out-of-vehicle communication device 112 and the central gateway 113 are connected through Ethernet cables 10, for example.

The switching device 102 and the power supply device are further connected through cables for serial communication (hereinafter, also referred to as serial cables) 11, for example.

The power supply device measures the noise of power to be supplied to the switching device 101 through the Ethernet cable 10, for example and the power supply voltage.

More specifically, the power supply device measures a noise amplitude Apow2 and a waveform Wpow2 for the power and creates supply power noise information including the measured noise amplitude Apow2 and the waveform Wpow2. The noise amplitude Apow2 and the waveform Wpow2 here are respectively similar to the above-mentioned noise amplitude Apow and the waveform Wpow, for example.

The power supply device periodically, for example, transmits the created supply power noise information to the switching device 101 through the serial cable 11.

Configuration of Switching Device 102

Figure 9:
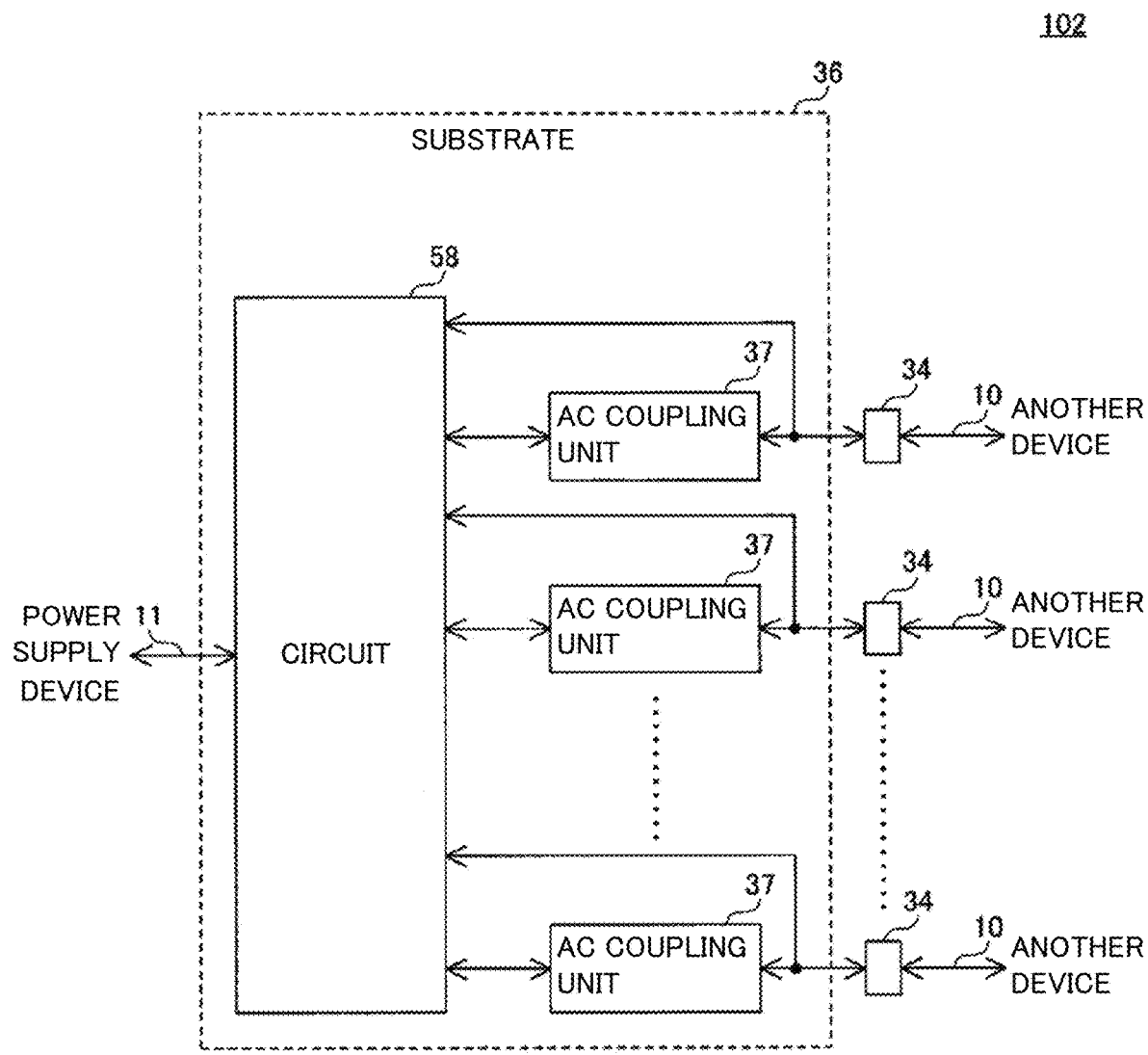
FIG. 9 illustrates an example of the configuration of a switching device in the on-vehicle communication system according to Embodiment 2 of the present disclosure.

FIG. 9 illustrates an example of the configuration of a switching device in the on-vehicle communication system according to Embodiment 2 of the present disclosure.

Referring to FIG. 9, the switching device 102 includes multiple communication ports 34, multiple AC coupling units 37 and a circuit 58.

The communication port 34 and the AC coupling unit 37 in the switching device 102 are respectively similar in operation to the communication port 34 and the AC coupling unit 37 in the switching device 101 illustrated in FIG. 2.

Figure 10:
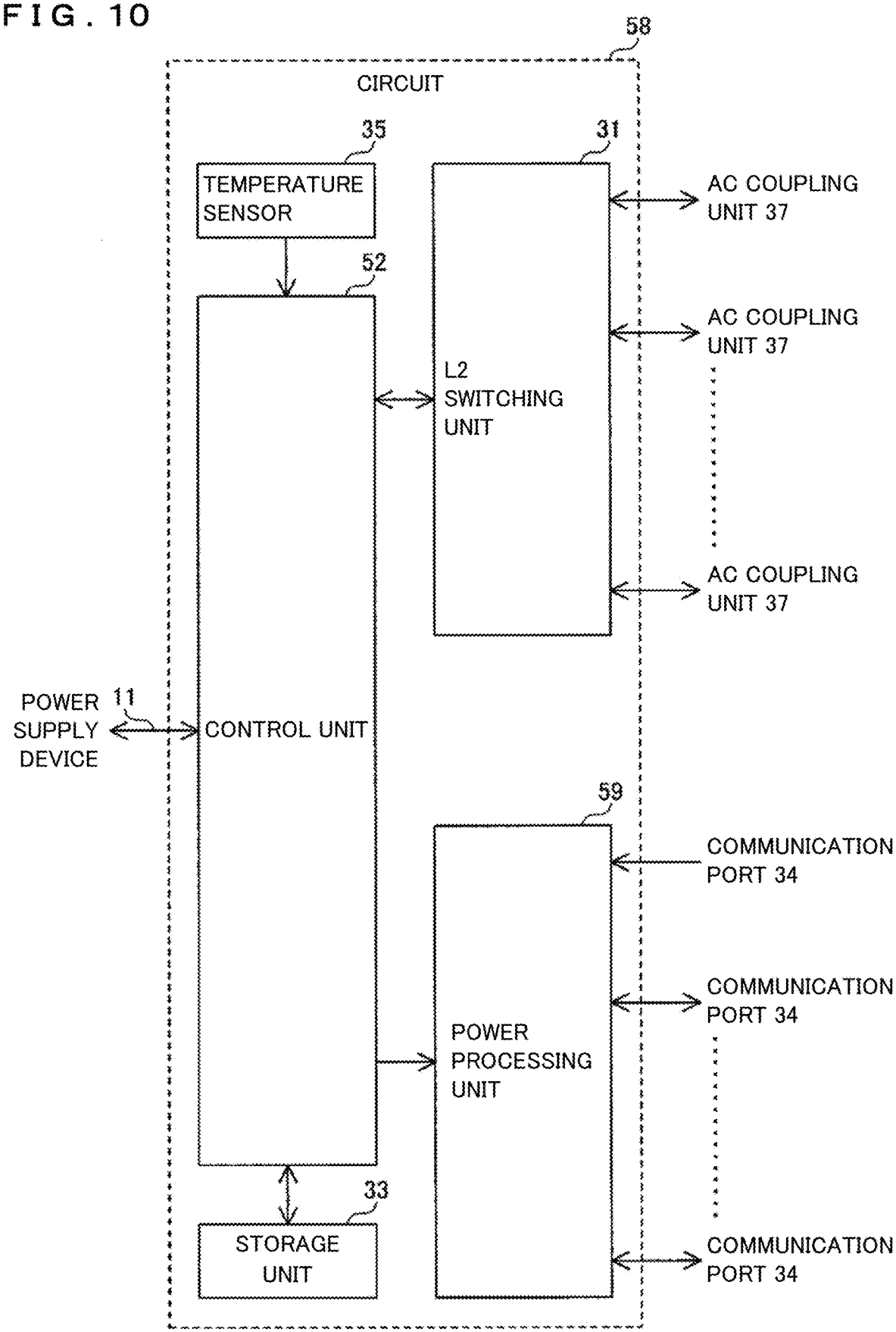
FIG. 10 illustrates an example of the configuration of a circuit in the switching device according to Embodiment 2 of the present disclosure.

FIG. 10 illustrates an example of the configuration of a circuit in the switching device according to Embodiment 2 of the present disclosure.

Referring to FIG. 10, the circuit 58 includes a layer 2 (L2) switching unit (measurement unit) 31, a control unit (determination unit and acquisition unit) 52, a storage unit 33, a temperature sensor 35 and a power processing unit 59.

The L2 switching unit 31, the control unit 52, the storage unit 33 and the temperature sensor 35 in the circuit 58 are respectively similar in operation to the L2 switching unit 31, the control unit 32, the storage unit 33 and the temperature sensor 35 in the circuit 38 illustrated in FIG. 3.

Figure 11:
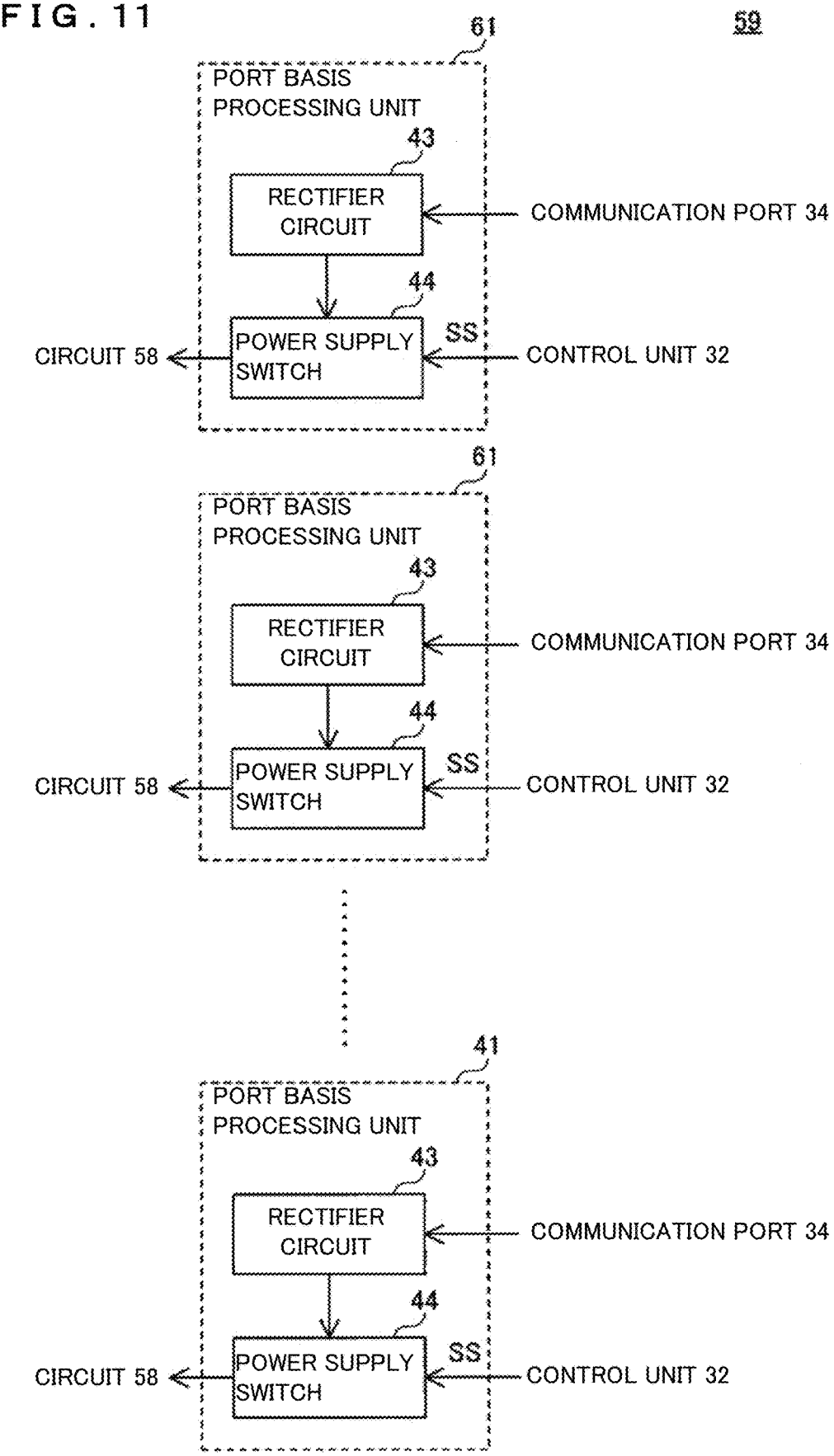
FIG. 11 illustrates an example of the configuration of an electric power processing unit in the circuit according to Embodiment 2 of the present disclosure.

FIG. 11 illustrates an example of the configuration of an electric power processing unit in the circuit according to Embodiment 2 of the present disclosure.

Referring to FIG. 11, the power processing unit 59 includes multiple port basis processing units 61. The port basis processing units 61 each include a rectifier circuit 43 and a power supply switch 44.

The rectifier circuit 43 and the power supply switch 44 in the port basis processing unit 61 are respectively similar in operation to the rectifier circuit 43 and the power supply switch 44 in the port basis processing unit 41 illustrated in FIG. 4.

Referring again to FIG. 10, a serial cable 11 is connected to the control unit 52. More specifically, the control unit 52 is connected to the power supply device through the serial cable 11 and makes serial communication with the power supply device via this serial cable 11.

The control unit 52 acquires a measurement result for noise in power from the supply source of the power supplied via the communication port 34, for example.

More specifically, the control unit 52 receives supply power noise information through the serial cable 11 from the power supply device connected via the communication port 34 and the Ethernet cable 10.

The control unit 52 performs determination processing based on the supply power noise information received from the power supply device.

Specifically, the control unit 52 performs determination processing based on, for example, the supply power noise information and the reception signal quality measured by the L2 switching unit 31.

More specifically, the control unit 52 judges the level of the noise and the quality of the reception signal based on, for example, the measurement result for noise included in the supply power noise information and the measurement result for reception signal quality by the L2 switching unit 31.

Concretely, the control unit 32 performs determination processing for each communication port 34 at intervals of a predetermined time, for example. In this determination processing, the noise amplitude Apow2 and the waveform Wpow2 are respectively processed similarly to the above-mentioned noise amplitude Apow and waveform Wpow.

In the switching device according to Embodiment 2 of the present disclosure, the control unit 52 is configured to acquire supply power noise information from the power supply device through, but not limited to, the serial cable 11. The control unit 52 may be configured to acquire the supply power noise information from the power supply device via the Ethernet cable 10 and the L2 switching unit 31.

As described above, in the switching device according to Embodiment 2 of the present disclosure, the control unit 52 acquires the measurement result for noise in power from the supply source of the power.

This makes it possible to make the configuration of the switching device 101 simple in comparison with a case where the noise of power in the cable for Ethernet communication is measured by the switching device 101, for example. Furthermore, since the noise of power can be measured without the noise of a signal being mixed at the supply source of the power, the switching device 101 can acquire a more correct measurement result.

Since the other configurations and operation are similar to those of the switching device according to Embodiment 1, the detailed description thereof will not be repeated here.

Noted that parts or all of the components and operation of the devices according to Embodiment 1 and Embodiment 2 of the present disclosure may appropriately be combined.

It is to be understood that the embodiments disclosed here is illustrative in all respects and not restrictive. The scope of the present disclosure is defined by the appended claims, and all changes that fall within the meanings and the bounds of the claims, or equivalence of such meanings and bounds are intended to be embraced by the claims.

The above description includes features of the clause described below.

Clause 1

A switching device mounted on a vehicle, comprising: a plurality of communication ports connectable to cables for Ethernet communication;

a circuit operated by using power supplied via each of the communication ports;

an acquisition unit that acquires a measurement result for noise in power supplied via each of the communication ports; and a determination unit that performs determination processing for determining whether or not power to be supplied via a corresponding one of the communication ports is to be output to the circuit, based on the measurement result for noise acquired by the acquisition unit, wherein the circuit is operated using power supplied via each of the communication ports by employing Power over Ethernet (PoE), and the acquisition unit acquires a difference between maximum voltage and minimum voltage of a wavelength indicating time variation of voltage based on the power supplied via each of the communication ports as the result of the measurement of the noise.

It is to be noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A switching device mounted on a vehicle, comprising:
   a plurality of communication ports connectable to cables for Ethernet communication;
   a circuit operated by using power supplied via each of the communication ports;
   an acquisition unit that acquires a measurement result for noise in power supplied via each of the communication ports, and
   a determination unit that performs determination processing for determining whether or not power to be supplied via a corresponding one of the communication ports is to be output to the circuit, based on the measurement result for noise acquired by the acquisition unit.

2. The switching device according to claim 1, further comprising a storage unit that holds correspondences between a plurality of temperatures of the switching device and determination criteria in the determination processing as to the noise, wherein the acquisition unit further acquires a temperature of the switching device of itself and acquires the correspondences from the storage unit, and the determination unit performs the determination processing further based on the temperature and the correspondences that are acquired by the acquisition unit.

3. The switching device according to claim 2, wherein the storage unit holds the correspondences for each of the communication ports.

4. The switching device according to claim 1, wherein the switching device further comprises a measurement unit that measures reception signal quality for each of the communication ports, and the determination unit performs the determination processing further based on the reception signal quality measured by the measurement unit.

5. The switching device according to claim 4, wherein the acquisition unit further acquires a measurement result for power supply voltage received via each of the communication ports, the determination unit judges a level of the noise and quality of the reception signal based on the measurement result for noise acquired by the acquisition unit and a measurement result for reception signal quality by the measurement unit, and performs the determination processing based on the measurement result for power supply voltage acquired by the acquisition unit and a measurement result for a signal voltage received via the communication port by the measurement unit if a judgement result for noise and a judgement result for reception signal quality are different from each other.

6. The switching device according to claim 1, wherein the acquisition unit acquires the measurement result for noise in power from a supply source of the power.

7. A determination method for a switching device mounted on a vehicle, the switching device including a plurality of communication ports connectable to cables for Ethernet communication and a circuit operated by using power supplied via each of the communication ports, comprising:

acquiring a measurement result for noise in power supplied via each of the communication ports; and determining whether or not power supplied via corresponding one of the communication ports is to be output to the circuit, based on the acquired measurement result for noise.

* * * * *